(12) United States Patent
Hansen (10) Patent No.: US 8,424,585 B2
(45) Date of Patent: Apr. 23, 2013

(54) METHOD AND APPARATUS FOR CREATING A PATTERN

(75) Inventor: Aaron Hansen, Kerrville, TX (US)

(73) Assignee: James Avery Craftsman, Inc., Kerrville, TX (US)

( * ) Notice: Subject to any disclaimer, the term of this patent is extended or adjusted under 35 U.S.C. 154(b) by 57 days.

(21) Appl. No.: 13/040,994

(22) Filed: Mar. 4, 2011

(65) Prior Publication Data

US 2012/0186769 A1 Jul. 26, 2012

Related U.S. Application Data

(60) Provisional application No. 61/435,242, filed on Jan. 21, 2011.

(51) Int. Cl.
*B22C 7/00* (2006.01)

(52) U.S. Cl.
USPC .............................. 164/45; 164/159; 164/235

(58) Field of Classification Search ............... 164/45, 164/159, 235, 246, 249, 412
See application file for complete search history.

(56) References Cited

U.S. PATENT DOCUMENTS

| | | | |
|---|---|---|---|
| 746,944 A | 12/1903 | Ford | |
| 1,281,258 A | 10/1918 | Alexander | |
| 2,712,173 A * | 7/1955 | Denner | 29/896.412 |
| 3,015,138 A | 1/1962 | Watts | |
| 3,177,537 A | 4/1965 | Horton | |
| 3,511,466 A * | 5/1970 | Kaplan | 249/57 |
| 3,946,039 A | 3/1976 | Walz | |
| 3,989,088 A | 11/1976 | Weissman et al. | |
| 4,003,423 A | 1/1977 | Shikinai et al. | |
| 4,013,259 A | 3/1977 | Tryon | |
| 4,040,466 A | 8/1977 | Horton et al. | |
| 4,081,019 A | 3/1978 | Kulig | |
| 4,161,208 A | 7/1979 | Cooper | |
| 4,170,256 A | 10/1979 | Blazek et al. | |
| 4,240,492 A | 12/1980 | Edwards et al. | |
| 4,240,493 A | 12/1980 | Wilmarth | |
| 4,300,617 A | 11/1981 | Bauer | |
| 4,316,498 A | 2/1982 | Horton | |
| 4,326,326 A | 4/1982 | MacDonald | |
| 4,340,107 A | 7/1982 | Bauer | |
| 4,346,750 A | 8/1982 | Nemethy | |
| 4,421,153 A | 12/1983 | Wilkinson et al. | |
| 4,492,577 A | 1/1985 | Farris et al. | |
| 4,558,841 A | 12/1985 | Engelman et al. | |
| 4,651,801 A | 3/1987 | Sasaki | |
| 4,682,644 A | 7/1987 | Ueno | |
| 4,700,760 A | 10/1987 | Weingarten | |
| 4,721,149 A | 1/1988 | Hesterberg et al. | |

(Continued)

OTHER PUBLICATIONS

Jurgen J. Maerz, Casting Tree Design and Investment Technique for Induction Platinum Casting, Internet source (http://www.platinumguild.com/output/page2414.asp, click on "Casting Tree Design and Investment Technique for Induction Platinum Casting"), 2002.

(Continued)

*Primary Examiner* — Kevin P Kerns (74) *Attorney, Agent, or Firm* — Cox Smith Matthews Incorporated (57) ABSTRACT

A method and apparatus for creating a pattern of an item of manufacture, the method and apparatus including the use of a mold frame, mold, mold core, injection frame and injection core to create patterns of items of manufacture for investment casting.

12 Claims, 9 Drawing Sheets

U.S. PATENT DOCUMENTS

| | | | |
|---|---|---|---|
| 4,741,378 A | 5/1988 | Engelman et al. | |
| 4,766,942 A | 8/1988 | Wessman et al. | |
| 4,888,213 A | 12/1989 | Hesterberg | |
| 4,981,167 A | 1/1991 | Anderson | |
| 5,004,037 A | 4/1991 | Castaldo | |
| 5,044,419 A | 9/1991 | Ware | |
| 5,140,869 A | 8/1992 | Mrdjenovich et al. | |
| 5,175,008 A | 12/1992 | Ueno | |
| 5,234,045 A | 8/1993 | Cisko | |
| 5,244,187 A | 9/1993 | Manginelli | |
| 5,257,658 A | 11/1993 | Perera | |
| 5,297,609 A | 3/1994 | Cook | |
| 5,318,093 A | 6/1994 | MacDonald | |
| 5,348,073 A | 9/1994 | Kubo et al. | |
| 5,364,889 A | 11/1994 | Quinn et al. | |
| 5,372,177 A | 12/1994 | Foster | |
| 5,465,780 A | 11/1995 | Muntner et al. | |
| 5,688,533 A | 11/1997 | Berger | |
| 5,713,410 A | 2/1998 | LaSalle et al. | |
| 5,735,335 A | 4/1998 | Gilmore et al. | |
| 5,735,336 A | 4/1998 | Oti | |
| 5,735,692 A | 4/1998 | Berger | |
| 5,749,411 A | 5/1998 | Zielinski et al. | |
| 5,836,830 A | 11/1998 | Onuki et al. | |
| 5,855,237 A | 1/1999 | Okada et al. | |
| 5,868,194 A | 2/1999 | Horwood | |
| 5,893,405 A | 4/1999 | Berger | |
| 5,897,592 A | 4/1999 | Caldarise et al. | |
| 5,909,765 A | 6/1999 | McDowell | |
| 5,965,171 A | 10/1999 | Katto et al. | |
| 6,004,368 A | 12/1999 | Chandley et al. | |
| 6,171,093 B1 | 1/2001 | Hawkinson | |
| 6,283,755 B1 | 9/2001 | Bergstrom et al. | |
| 6,298,904 B2 | 10/2001 | Polich | |
| 6,299,818 B1 * | 10/2001 | Hawkinson | 264/478 |
| 6,344,160 B1 | 2/2002 | Holtzberg | |
| 6,349,758 B1 | 2/2002 | Bell | |
| 6,382,217 B2 | 5/2002 | Coker et al. | |
| 6,467,530 B1 | 10/2002 | Bell | |
| 6,467,531 B1 | 10/2002 | Doney | |
| 6,488,074 B2 | 12/2002 | Usui | |
| 6,551,396 B1 | 4/2003 | Pineda et al. | |
| 6,637,497 B2 | 10/2003 | Herron | |
| 6,667,112 B2 | 12/2003 | Prasad et al. | |
| 6,684,934 B1 | 2/2004 | Cargill et al. | |
| 6,779,590 B2 | 8/2004 | Pineda et al. | |
| 6,880,615 B2 | 4/2005 | Cser | |
| 6,997,818 B2 | 2/2006 | Kouno | |
| 7,048,030 B1 | 5/2006 | Eisele et al. | |
| 7,114,547 B2 | 10/2006 | Sullivan et al. | |
| 7,204,296 B2 | 4/2007 | Redemske et al. | |
| 7,237,375 B2 | 7/2007 | Humcke et al. | |
| 7,281,566 B2 | 10/2007 | Chikugo et al. | |
| 7,296,438 B2 | 11/2007 | Kolb | |
| 7,303,392 B1 | 12/2007 | Schermerhorn et al. | |
| 7,325,585 B1 | 2/2008 | Benetti | |
| 7,343,730 B2 | 3/2008 | Humcke et al. | |
| 7,461,684 B2 | 12/2008 | Liu et al. | |
| 7,463,942 B2 | 12/2008 | O'Brien et al. | |
| 7,475,717 B2 | 1/2009 | Chikugo et al. | |
| 7,491,136 B2 | 2/2009 | Deng et al. | |
| 7,628,604 B2 | 12/2009 | Schuessler | |
| 2002/0162642 A1 | 11/2002 | Walker, Sr. | |
| 2004/0060685 A1 | 4/2004 | Ray et al. | |
| 2006/0021730 A1 | 2/2006 | Marcin, Jr. | |
| 2006/0032600 A1 | 2/2006 | Bjork | |
| 2006/0175037 A1 | 8/2006 | Chikugo et al. | |
| 2007/0295470 A1 | 12/2007 | Chikugo et al. | |
| 2008/0000607 A1 | 1/2008 | Chikugo et al. | |
| 2008/0202718 A1 | 8/2008 | Paul et al. | |
| 2008/0232999 A1 | 9/2008 | Fogel | |
| 2010/0003619 A1 | 1/2010 | Das et al. | |
| 2010/0006252 A1 | 1/2010 | Roby | |

OTHER PUBLICATIONS

"MasterCarve Class Ring System, Creativity, Freed by Engineering, The New MasterCarve System and Your CAD/CAM Open The Carved Ring Market to Your Design Creativity!", Rio Grande, Bluewater Road NW, Albuquerque, New Mexico 87121, 2002.

"Solidscape When Precision Counts..", Liron Noy, Precision Wax—020787068851 www.precision-wax.com, Date Unknown.

* cited by examiner

FIG. 10A

METHOD AND APPARATUS FOR CREATING A PATTERN

RELATED APPLICATION

This application claims priority to U.S. Provisional Application 61/435,242 entitled "Methods and Apparatus for Creating a Pattern" filed Jan. 21, 2011, which is hereby entirely incorporated herein by reference.

FIELD

The disclosed method and apparatus pertain to manufacturing of components, including jewelry, by investment casting using patterns produced by injection molding.

BACKGROUND

Investment casting (or the lost wax process) is one of several techniques for manufacturing items such as jewelry, ornaments, figurines and machine parts. For example, to make a jewelry finger ring using the lost wax process, a jeweler may first create a ring design to serve as a model. The model may be created of metal, foam, wax, clay, plastic, wood or other shapeable material. A gate (also called a runner or sprue branch) may be attached to each model. A mold may be created of the model, and may comprise a substantially exact negative of the model. The mold may be created of any suitable flexible material, such as natural or synthetic rubber, or polyurethane. The mold may be cut away from the model so as to leave the mold in one or more pieces. The mold may be provided with vents to allow air to escape during wax injection. Plastic may be used instead of wax. The mold may then be placed in a mold frame and injected with wax to create a wax pattern of the model. After solidifying, the wax pattern may be removed from the mold. Multiple wax patterns may be created. The gated patterns may be attached to a central sprue rod to form a tree-like structure ("tree"). Thus assembled, the tree may then be invested in a ceramic, plaster or other refractory material and placed in an oven for high-temperature curing. As it cures, the investment material hardens into a durable foundry mold. The heat of the oven melts or burns the wax out of the mold, leaving channels in the mold into which castable metal alloy may flow. Castable metal alloys, such as sterling silver, may be melted, and then poured into the investment mold and allowed to solidify. After the alloy solidifies and cools, the mold may be broken or split open to allow removal of a tree of castings, each of which may be substantially identical to the model. The rings may be cut from their sprue branches and finished. The finishing process may include removing sprue stumps, mold seams or other imperfections, and polishing.

The model ring may be created in a single ring size. The foregoing process may be accomplished to create patterns for each ring design that are then sized for different finger sizes. Generally, twelve to fourteen patterns may be made in whole and half sizes. Each pattern may then be used to create a metal model of each size ("size model"). Each size model may then be used to create multiple finished rings as described above. For example, a sprue may be soldered to a size model, finished to remove imperfections, and may be plated with, for example, rhodium, gold or nickel to protect the model during the high-temperature vulcanization process.

To fabricate a mold, a mold technician may pack the size model with, e.g., up to twelve layers of ⅛" un-vulcanized rubber sheet, and may install a sprue former on the end of the sprue. The sprue former may comprise a conical piece of brass that fits the nozzle of a wax or plastic injector. The packed size model may then be placed in a steel or aluminum frame. The assembly may then be placed in a vulcanizing apparatus and the rubber vulcanized under pressure at approximately 300° F. for approximately seven minutes per rubber layer. The inert metal plating may protect the size model from degradation during the vulcanization process.

After the mold is removed from the vulcanizing apparatus and cools, the mold technician may then cut the rubber mold away from the size model with a scalpel. The mold cutting process typically requires high skill. Typically, a flap may be cut in the rubber mold to allow removal of the ring, or the mold may be cut into two or more pieces indexed to allow accurate reassembly. The mold may be vented to allow air to escape during injection of pattern material. Injection of pattern material and casting may be accomplished as described above.

All models must be appropriately dimensioned with regard to their internal geometry to obtain the desired sizes. This requires knowledge of the degree of shrinkage of wax or plastic patterns occurring during process steps. For ring models, the internal circumference of the rings must be appropriately dimensioned to obtain the desired full and half sizes. To estimate shrinkage, the patterns of the largest and smallest ring sizes may be molded. The degree of shrinkage for these patterns may then be measured. Based on these measurements, shrinkage rates for the other sizes may be estimated. For example, a ring size model may be created approximately ¼ ring size larger than the desired final dimensions in order to accommodate mold-related shrinkage.

Generally, the quality of the finished rings may depend on, among other things, the mold materials used, the skill and cutting technique of the mold technician, the wax or plastic injection equipment and settings, the investment equipment and materials, and the casting equipment and materials. For example, deformation of the mold can result in too much variance in a ring's internal dimension or size for a given size model. Or, for example, the mold frame and injection nozzle may distort the mold. There exists a need for a method and apparatus for fabricating injection molds and using such molds to produce patterns of more consistent quality so as to improve the quality of the final manufactured component.

SUMMARY

A method for creating a pattern of a model, the method comprising mounting a model to a mold core; placing the mold core and model in a mold frame, the mold frame configured to receive a mold material; providing a liquid mold material into the mold frame, the mold material capable of solidifying or curing into a mold; after the mold material solidifies or cures into a mold, removing the mold from the mold frame; removing the mold core and model from the mold, thereby creating a cavity in the mold substantially in the shape of the mold core and model; inserting an injection core into the cavity; placing the mold in an injection frame; injecting liquid pattern material into the mold such that the pattern material flows into the cavity and around the injection core, the pattern material capable of solidifying or curing into a pattern; and after the pattern material solidifies or cures into a pattern, removing the pattern from the mold and injection core.

An apparatus for creating a pattern of a model, the apparatus comprising a mold frame configured to receive a liquid mold material, the mold material capable of solidifying or curing into a mold; a mold core removably mountable in the mold frame, the mold core configured for mounting a model thereon and for forming a cavity in a mold; an injection frame configured to receive the mold; and an injection core removably insertable into a cavity of the mold.

An apparatus for creating a pattern of a model, the apparatus comprising molding means for creating a mold capable of receiving an injection core; and injecting means for receiving the mold having the injection core inserted therein.

DETAILED DESCRIPTION

The disclosed method and apparatus may be used to create a pattern of an item of manufacture, or model. In one embodiment of such a method, a model comprising a gated jewelry ring may be mounted to a cylindrical mold core. The mounted ring may be placed within a standardized mold frame indexed to receive the core, and a mold material such as room temperature vulcanized (RTV) silicone may be poured into the mold frame and allowed to cure into a mold. After curing, the mold may be removed from the mold frame, and the ring and core removed from the mold. The mold may then be used to create a number of wax or plastic patterns of the ring suitable for investment casting. A pattern may comprise a whole or partial representation of a model. The mold may be placed in a standardized injection frame, and a cylindrical injection core placed in the mold in the cavity formed by the mold core. Liquid wax or plastic may then be injected into the mold, where it may fill the cavity formed by the gated jewelry ring. After the wax or plastic solidifies or cures into a pattern, the injection core may be removed from the mold. The pattern may be removed from the mold, and mounted to a central sprue to form a casting "tree" for investment casting. Using a mold core and an injection core may reduce variation in internal circumference for a given ring size. Using a mold core and an injection core may allow patterning of an item of manufacture, and production of patterns for production investment casting. Variations on the foregoing method, and additional embodiments, are disclosed further herein.

One embodiment of an apparatus may include a mold frame and a mold core, and an injection frame and an injection core. The frames may be of a standardized size to allow a mold created in the mold frame to fit, with minimal distortion, into an injection frame. In a production environment, providing standardized mold and injection frames may allow for re-use of mold and frame parts, and for ready replacement of the mold and frame parts as they wear out or are damaged. Variations on the foregoing apparatus, and additional embodiments, are disclosed herein.

Figure 1:
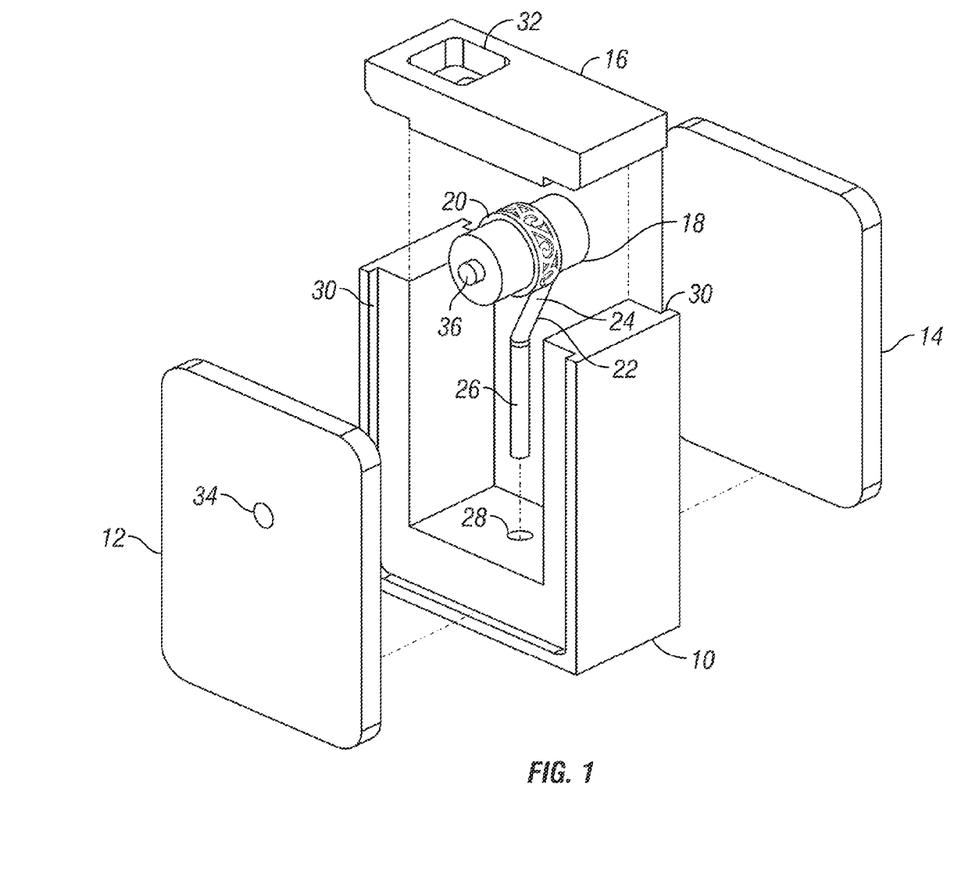
FIG. 1 illustrates an exploded view of an embodiment of a mold frame.

As may be seen in the embodiment of FIG. 1, a mold frame may comprise a bracket 10, an index plate 12, a backing plate 14 and a top plate 16. The bracket 10, index plate 12, backing plate 14 and top plate 16 may be configured so as to allow assembly together to form a mold enclosure. A mold frame may comprise different, more or fewer parts as may be convenient for mold frame assembly or disassembly. Also depicted in FIG. 1 are a mold core 18 having an exemplary jewelry ring model 20 mounted thereto. One or more gate forms 22 may be mounted to the ring model 20. In some embodiments, the gate form 22 may comprise an upper contact 24 and a lower base 26. Of course, the exemplary mold frame disclosed in FIG. 1 may be used to manufacture items of a variety of shapes, parts and configurations, and is not limited for use in manufacturing jewelry.

In the embodiment of FIG. 1, the bracket 10 may comprise a three-sided frame having one or more openings 28 formed to provide one or more gate apertures, or entrances, into the mold enclosure. The gate apertures may be provided to allow removable mounting of a gate form therein. The bracket 10 may further comprise recesses 30 configured to receive the index plate 12 and backing plate 14. In some embodiments, the bracket 10 may comprise metal, such as aluminum or steel. However, the bracket 10 may comprise any suitably rigid material, such as polycarbonate, acrylic, nylon, glass, ceramic or wood.

The top plate 16 may be configured such that when mounted to the bracket 10, the top plate 16 provides another "side" to the mold enclosure formed by the mold frame. The top plate 16 may be provided with one or more openings 32 into the mold enclosure formed by the mold frame. The top plate 16 may comprise any suitably rigid material, such as metal, polycarbonate, acrylic, nylon, glass, ceramic or wood.

The index plate 12 may be configured such that when mounted to the bracket 10, the index plate 12 provides yet another "side" to the mold enclosure formed by the mold frame. The index plate 12 may comprise a substantially flat and smooth surface so as to allow formation of a regularly dimensioned mold enclosure. In some embodiments, the index plate 12 may further comprise one or more notches or openings 34 to ensure proper positioning of the mold core 18 in the mold frame. In some embodiments, the index plate 12 may comprise a translucent material, such as polycarbonate or acrylic, so as to allow a technician to see whether the mold frame has been properly filled with mold material. However, the index plate 12 may comprise any suitably rigid material, such as metal, nylon, glass, ceramic or wood.

The backing plate 14 may be configured such that when mounted to the bracket 10, the backing plate 14 provides a further "side" to the mold enclosure. The backing plate 14 may comprise a substantially flat and smooth surface so as to allow formation of a regularly dimensioned mold enclosure. In some embodiments, the backing plate 14 may comprise a translucent material, such as polycarbonate or acrylic, so as to allow a technician to see whether the mold frame has been properly filled with mold material. However, the backing plate 14 may comprise any suitably rigid material, such as metal, nylon, glass, ceramic or wood.

A mold frame may comprise different, more or fewer parts as may be convenient for mold frame assembly or disassembly. For example, the bracket 10 and the backing plate 14 may be formed as a unitary item of manufacture. Indexing openings may be provided in other frame parts as an alternative or in addition to the indexing opening 34 of the index plate 12. For example, an indexing opening may be provided in the backing plate 14. Likewise, a gate aperture may be provided in other parts of the mold frame, such as in the top plate 16.

The mold core 18 may be used to provide dimensional stability to molded items. In the jewelry ring example, the mold core 18 may comprise a cylinder of relatively rigid material to which a jewelry ring model 20 may be mounted. The ring model 20 may be mounted to the mold core 18, and may be further sealed to the mold core 18 by a suitable adhesive, such as cyanoacrylate or UV-cured adhesive. An adhesive may be applied around the ring model 20 where it contacts the mold core 18 to prevent any voids between the mold core 18 and ring model 20. Sealing the ring model 20 to the mold core 18 may prevent mold material from seeping between the ring model 20 and mold core 18. In the jewelry ring example, the mold core 18 may be formed or machined to specific diameter tolerances. The mold core 18 may be sized to permit a variety of ring sizes. In some embodiments, the ring model 20 and mold core 18 may be formed as a unitary item of manufacture, such as by using stereolithography, by hand-carving or by CNC machining or combination of forming methods, thus avoiding the need for sealing the ring model 20 to mold core 18. In some embodiments, the mold core 18 may comprise various shapes and dimensions, such as square for square rings or other model designs.

Preferably, the mold core 18 may include one or more indexing posts or bumps 36 configured to fit into the notches or openings 34 in the index plate 12 so as to allow consistent positioning of mold core 18 in the mold frame. Indexing the mold core 18 to the index plate 12 may allow a mold technician to consistently mount a model 20 within the mold frame. For example, a ring model 20 may be mounted so that its radial plane is parallel to the index plate 12 and backing plate 14. Thus, if the mold core 18 is cylindrical, the mold core 18 may be mounted in the mold frame so that the long axis of mold core 18 is perpendicular to the index plate 12. Indexing the mold core 18 in the mold frame may allow for easier removal of the mold core 18 and model 20 from the mold.

Consistent orientation within the mold enclosure may allow a mold technician to more easily and quickly remove the model 20 and mold core 18 from the mold frame, while minimizing the cuts needed to free the model 20 and mold core 18 from mold material (not shown), and minimizing potential damage to the model 20. Thus, less skill may be required of mold technicians to create a mold. With jewelry rings, for example, use of a mold core 18 may minimize variation in dimensions for a desired ring size. Mold cores 18 of different sizes may be configured for mounting within a universal mold frame. Use of differently sized mold cores 18 in a universal mold frame may allow for efficient creation of molds for different sized rings in a way that minimizes pattern shrinkage and variation of internal circumference dimensions. A universal mold frame may allow mounting of mold cores 18 of different sizes and having different ring shapes and designs, yet form a mold of standard external dimensions. By controlling shrinkage, dimensional variation for ring sizes may be reduced, thus reducing the need for post-casting ring-sizing activity, as well as reducing the need for bench and polishing labor on the cast product.

The mold core 18 may comprise any suitably rigid material, such as metal, polycarbonate, acrylic, nylon, glass, ceramic or wood. Preferably, the mold core 18 may comprise any non-marring, rigid, low-friction, dimensionally stable material that readily dissipates heat, such as polyoxymethylene plastic (such as that sold by DuPont under the DELRIN trademark). If a UV-cured adhesive is used to seal a model to the mold core 18, the mold core 18 may comprise a translucent material, such as polycarbonate or acrylic, for better curing of the adhesive by allowing passage of UV light. The mold core 18 may be solid or hollow.

In the embodiment of FIG. 1, the gate form 22 is preferably modular to allow uniform gating for manufacture of items of a variety of shapes. In other embodiments, a gate form 22 or other shape or form may be used. As may be seen in the embodiment of FIG. 1, the gate form 22 may comprise an upper contact 24 and a lower base 26. The lower base 26 may comprise a standard-diameter sprue configured for use with a universal mold frame and a variety of mold cores and ring models. Thus, the mold frame and lower base 26 may be standardized for use with a variety of mold cores and models, and a corresponding variety of upper contacts 24 extending between the lower base 26 and model 20. The upper contact 24 and lower base 26 may each comprise any suitable flexible or rigid material, such as rubber, or wax, plastic or metal.

Figure 2A:
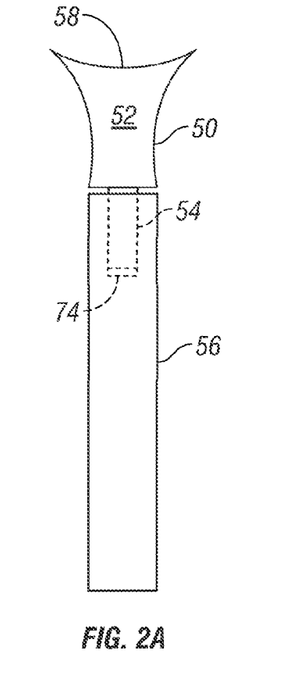
FIG. 2A illustrates an elevation view of an embodiment of a gate form.
Figure 2B:
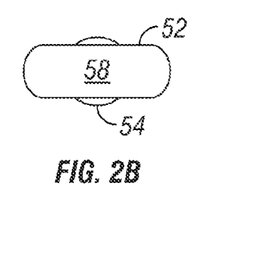
FIG. 2B illustrates a top plan view of the gate form of FIG. 2A.

As may be seen in the embodiment of FIGS. 2A-B, the upper contact 50 may comprise an arm 52 and adaptor 54. The upper contact 50 may be removably connected to a lower base 56. The adaptor 54 may removably fit into a receptacle 74 formed in the lower base 56, thus joining the upper contact 50 and lower base 56. The upper contact 50 and lower base 56 may be joined by any other suitable means, such as threaded attachment, magnetic attachment, adhesive attachment, interference fit and the like. The arm 52 may be configured for mounting to an item of manufacture. In the embodiment of FIGS. 2A-B, the arm 52 is configured for mounting to a jewelry ring (not shown). The arm 52 may comprise a curved mounting surface 58 on which the ring may be mounted. The upper contact 50 may be removably, semi-permanently or permanently mounted to an item of manufacture, such as by wax, high-strength adhesive or solder.

Figure 3A:
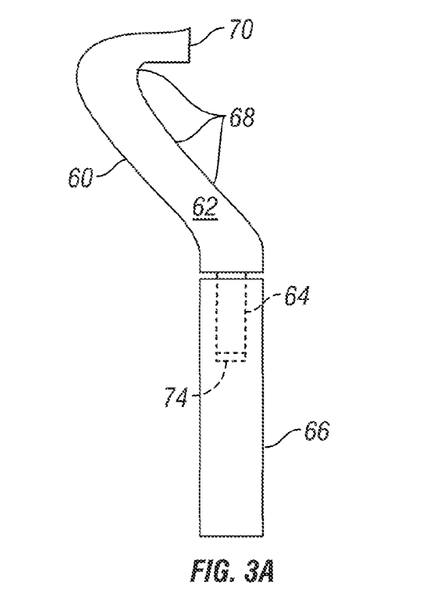
FIG. 3A illustrates an elevation view of another embodiment of a gate form.
Figure 3B:
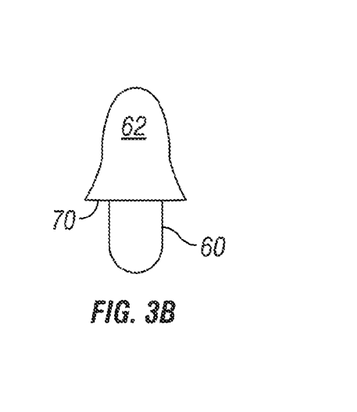
FIG. 3B illustrates a top plan view of the gate form of FIG. 3A.

In the embodiment of FIGS. 3A-B, the upper contact 60 may comprise an arm 62 and adaptor 64. The upper contact 60 may be removably connected to a lower base 66. The adaptor 64 may removably fit into a receptacle 74 formed in the lower base 66, thus joining the upper contact 60 and lower base 66. As with the embodiment of FIGS. 2A-B, the upper contact 60 and lower base 66 may be joined by any other suitable means, such as threaded attachment, magnetic attachment, adhesive attachment, interference fit and the like. The arm 62 may comprise a curved portion 68 so as to allow sufficient space for substantially non-turbulent flow of pattern material in an injection mold or metal in an investment mold. A flat mounting surface 70 may be provided for mounting to, for example, the side of the ring model 20 of FIG. 1. The upper contact 60 may be removably, semi-permanently or permanently mounted to an item of manufacture, such as by wax, high-strength adhesive or solder.

Figure 4:
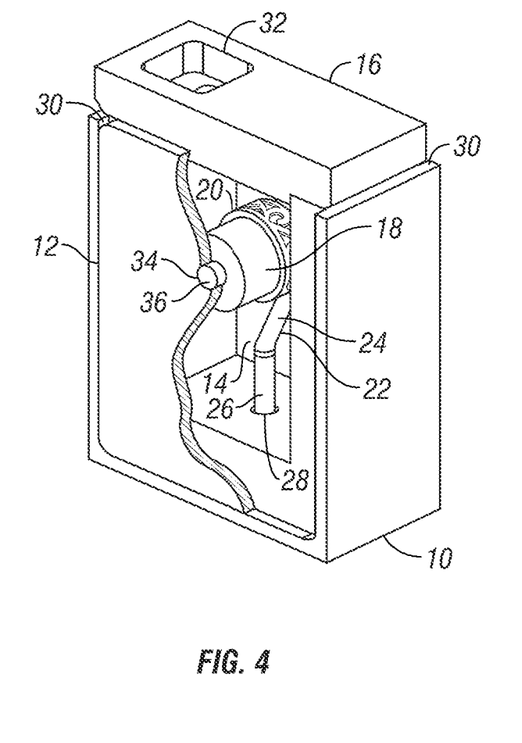
FIG. 4 illustrates a view the mold frame of FIG. 1, substantially assembled.

In some embodiments, the gate form 22 may be configured so that when the mold frame is assembled with the mold core 18 indexed to the index plate 12, the item of manufacture 20 is mounted to the mold core 18, and the gate form 22 is mounted to the item of manufacture, the lower base 26 of the gate form 22 fits into the gate aperture 28 of the bracket 10, as shown in the embodiment of FIG. 4.

In other embodiments, the bracket 10 may not include any gate aperture 28. In some embodiments, the lower base 26 may butt against the inside of the bracket 10, or may simply extend freely without contacting the bracket 10. In further embodiments, a gate form 22 may not be used at all, or a plurality of gates 22 may be used. In yet other embodiments, the gate aperture 28 of bracket 10 may be temporarily sealed with wax or plastic if a gate form 22 is not used or if a gate form 22 is used but does not extend into the gate aperture 28.

The mold frame may be assembled such that the bracket 10, top plate 16, backing plate 14 and index plate 12 form a mold enclosure. In the embodiment of FIG. 4, the index plate 12 is shown as partially cut away to reveal the mold enclosure. In one embodiment, the top plate 16 may not be assembled with the mold frame until after the mold frame is substantially filled with a mold material. The mold core 18 may be mounted within the mold enclosure such that the mold core 18 is indexed to the index plate 12. The mold frame may be held together by an external clamp system (not shown) such as rubber bands, C-clamps or a jig. The mold frame may alternatively be held together by screws joining the mold frame parts, latches, or by any other suitable connectors (not shown). In some embodiments, the mold frame may be held together in such a way as to allow full or partial disassembly after the mold material cures. In some embodiments, the mold core 18 is sized so as to be substantially immovably fixed between the backing plate 14 and indexing plate 12 when the mold frame is assembled. In FIG. 4, the mold frame is shown oriented such that mold material may be poured into the mold enclosure through the top plate 16.

After the mold frame is assembled with the mold core 18 and an item of manufacture 20 mounted in the mold enclosure, a mold material (not shown) may be poured or injected into the mold enclosure formed by the mold frame. If the top plate 16 was not assembled with the mold frame, then the top plate 16 may be assembled with the mold frame after some or all of the mold material has been poured into the mold frame. In one embodiment, a room-temperature-vulcanization (RTV) silicone may be used as a mold material. Use of RTV silicone may avoid the need for curing ovens and hydraulic pressure typically used for non-RTV silicone or rubber mold formation. Use of RTV silicone may also avoid the need for plating the model 20, and may result in a longer mold life. However, any other suitable mold material may be used, such as an ultraviolet light-curable silicone, although room- or low-temperature curable materials may be preferred so as to avoid the shrinkage and corrosion associated with high-temperature vulcanization.

In some embodiments, the mold enclosure may comprise regular inside dimensions so that when the mold material solidifies or cures and is removed from the mold frame, the mold dimensions are similarly regular. Regular dimensions may, for example, comprise a simple geometric solid, such as a cube or rectangular solid.

Figure 5:
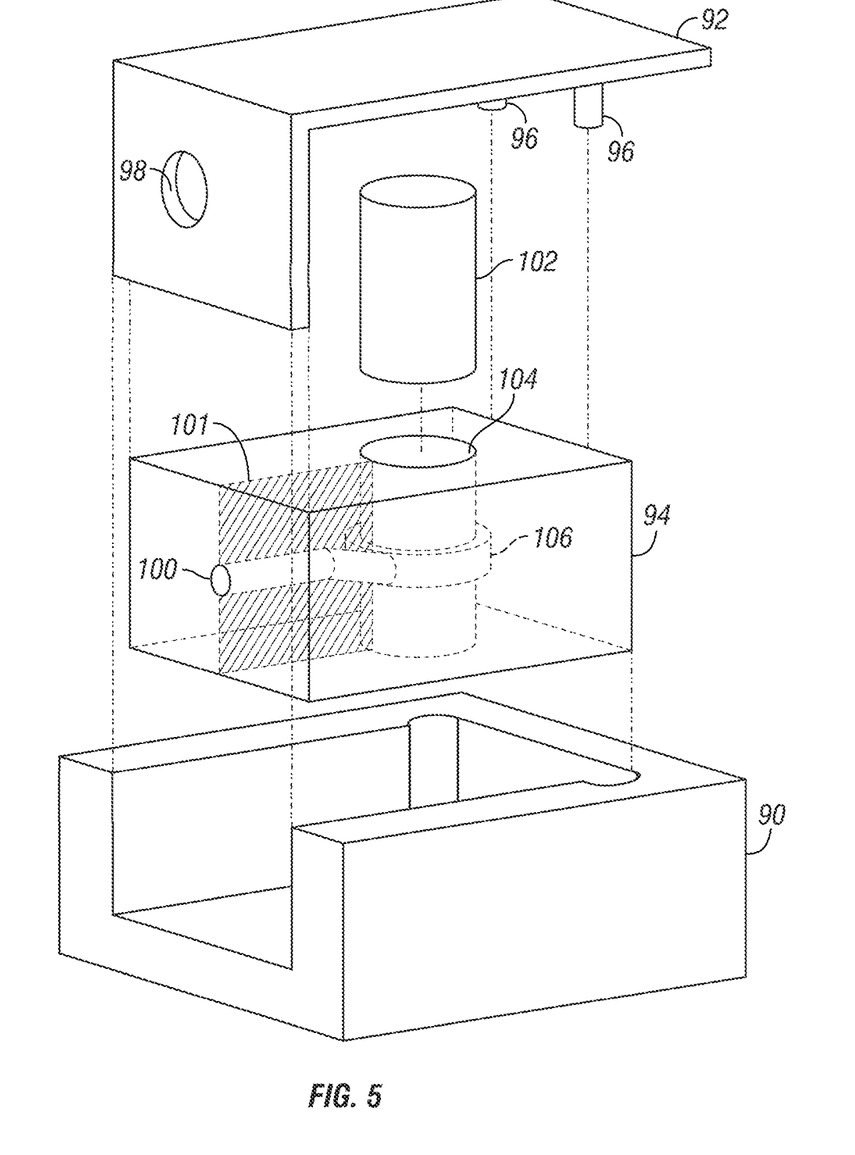
FIG. 5 illustrates an exploded view of an embodiment of an injection frame.

With reference to FIG. 5, after removal from the mold frame, a mold 94 may be cut, for example at cut plane 101, for removal of the mold core 18 and item of manufacture 20. The gate form 22 may also be removed, leaving a cavity 100 in the mold 94 in the shape of the gate form 22, a cavity 104 in the shape of the mold core 18 and a cavity 106 in the shape of the item of manufacture 20. The mold 94 may also be vented. The mold 94 may be placed in an injection frame with an injection core seen in FIG. 5 so that pattern material may be injected into the mold 94 to create a pattern of the item of manufacture.

In the embodiment of FIG. 5, the injection frame comprises a block 90 and a cover 92. Preferably, the block 90 may comprise any suitably rigid material, such as metal, polycarbonate, acrylic, nylon, glass, ceramic or wood. The block 90 may be dimensioned so that the mold 94 may fit within the block 90 substantially without compression or distortion of the mold 94. In the embodiment of FIG. 5, the block 90 comprises a base and three sides. The cover 92 may be configured to substantially enclose the mold 94. In the embodiment of FIG. 5, the cover 94 comprises one or more key posts 96 that help maintain the cover 92 positioned about the mold 94. The cover 92 may further comprise a nozzle opening 98 sized to accommodate the nozzle of a wax or plastic injector (not shown). The nozzle opening 98 may be carefully positioned in the cover 92 to align with the mold gate 100.

With reference to FIGS. 4 and 5, an injection core 102 may be created of the same dimensions as the mold core 18 used to form the mold cavity 104. The injection core 102 may be solid or hollow. The injection core 102 may be configured for mounting within the injection frame, and may be placed in the mold cavity 104 prior to insertion of the mold 94 into the injection frame. The injection core 102 may thus replace the mold core 18 in the mold 94, leaving a cavity 106 that is shaped like the item of manufacture 20 and a mold cavity 100 that is shaped like the gate form 22.

Figure 6:
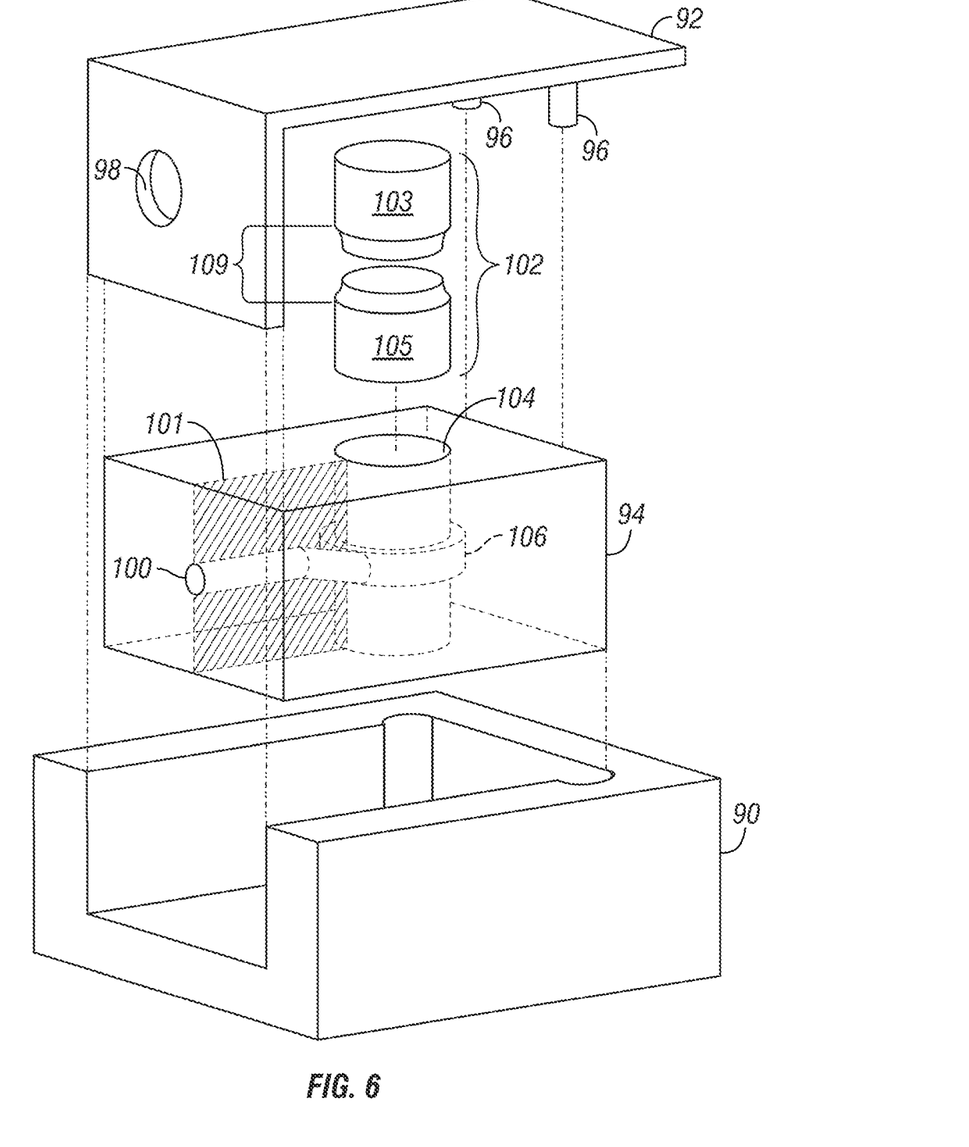
FIG. 6 illustrates an embodiment of an injection frame including a two-part injection core.

In other embodiments, the injection core may be created in one or more parts. In yet further embodiments, the injection core may have one or more different dimensions than the mold core. For example, a mold core for a ring model may comprise a one-part cylinder. In the embodiment of FIG. 6, an injection core 102 may be configured to form a wax or plastic pattern of the model ring having "comfort-fit" dimensions. Comfort-fit rings typically may be slightly rounded, or domed, on the inside of the ring. In other words, the ring may be thicker in the middle than at the edges. An injection core configured to form a wax or plastic pattern of the model ring having "comfort-fit" dimensions may comprise a cylinder of the same size as the mold core, but further comprise a shallow circumferential groove 109 to form the rounded inner surface of the ring.

In the embodiment of FIG. 6, the injection core 102 may optionally comprise two sections 103 and 105 that join in the area of the shallow circumferential groove 109 to allow removal of a wax or plastic pattern from the injection core. In the embodiment of FIG. 6, the first section 103 and second section 105 may be held together by the injection frame itself. In other embodiments, the first section 103 and second section 105 may be held together by any other suitable means, such as threaded attachment, magnetic attachment, adhesive attachment, interference fit and the like. In another embodiment, the injection core may comprise a cylinder of the same size as the mold core, but without the shallow circumferential groove 109. Thus, grooved and non-grooved injection cores may each be used with the same mold. The grooved injection core may be used to mold "comfort-fit" patterns of a ring model, while the non-grooved injection core may be used to mold non-"comfort-fit" patterns of the ring model.

A wax injector (not shown) such as that manufactured by Yasui & Co., may be used to create wax patterns. Alternatively, plastic injectors may be used to make plastic patterns. Wax injectors and patterns are described herein by way of example only. The injection frame of FIG. 5 is shown oriented such that the long axis of the injection core 102 is oriented substantially vertically when the injection frame is placed with respect to the injector. Typically, the injection frame may be placed into an injector (not shown) with this orientation to better allow flow of injected material around the injection core 102. For a given item of manufacture, such as a ring, a plurality of molds may be made for each ring size.

To assemble a mold 94 in an injection frame, a mold 94 may be placed in a block 90. An injection core 102 may be placed in the mold. A cover 92 may be fitted to the block 90 such that the nozzle opening 98 is aligned with the mold gate 100. So assembled, the injection frame may be positioned with respect to the injector so that the nozzle of the injector is positioned against the nozzle opening 98 of the cover 92. The nozzle of the injector may also contact the mold 94. If the nozzle contacts the mold 94, the nozzle may be positioned so as to minimize distortion of the mold 94. Liquid pattern material, such as wax or plastic, may be injected under pressure to fill the mold cavities 100 and 106. The liquid pattern material may flow through the gate and around the injection core, thus forming a pattern of the item of manufacture mounted to a gate form. The process may be repeated for multiple injection frames, thus quickly creating a plurality of identical patterns in different sizes. After the pattern material cools, each wax pattern may be removed from its mold and from the injection core. The patterns may then be mounted to a sprue rod to form a casting tree for investment casting as is known in the art.

Figure 7:
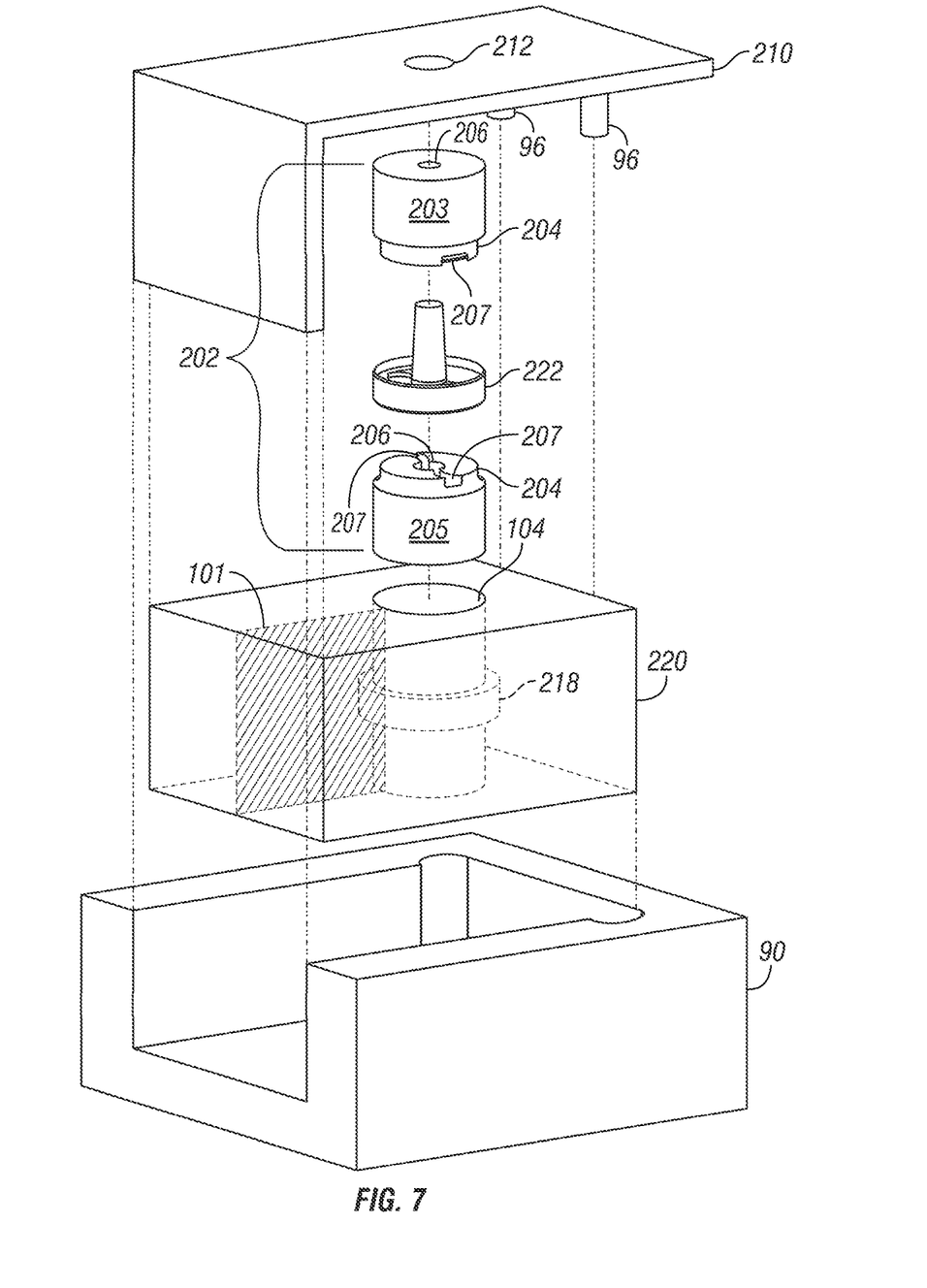
FIG. 7 illustrates an embodiment of an injection frame including a two-part injection core provided with an injection channel.

FIG. 7 illustrates another embodiment of a two-part injection core for forming ring patterns. In FIG. 7, a two-part injection core 202 comprises first section 203 and a second section 205. The injection core 202 may comprise a primary injection channel 206 that extends through the first section 203. One or more radial injection channels 207 may extend from the primary injection channel 206 to a circumferential groove 204 that may be provided in the injection core 202 for forming a ring pattern having "comfort fit" dimensions. In other embodiments, the injection core 202 may not have a circumferential groove 204, and the radial injection channels 207 may extend to the outer surface of the injection core 202.

Figure 8A:
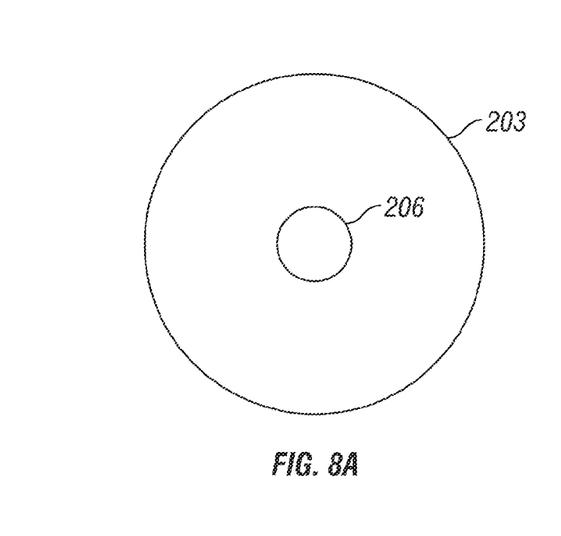
FIGS. 8A-C illustrate top, right side and bottom views of an embodiment of a first section of the two-part injection core of FIG. 7.
Figure 8B:
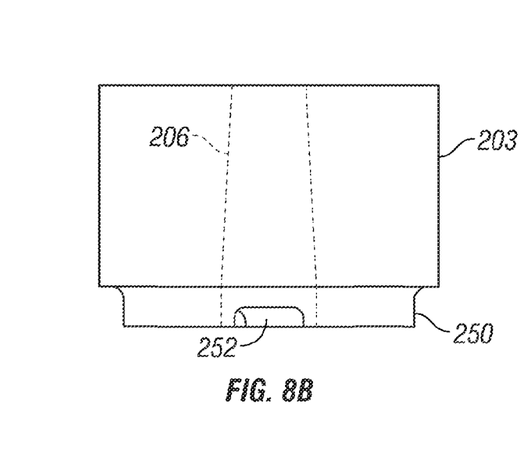
Figure 8C:
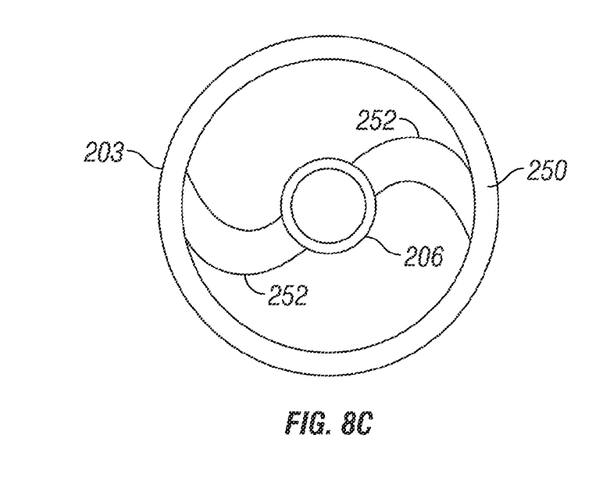

FIGS. 8A-C provide various views of the first section 203 of the two-part injection core 202 of FIG. 7. FIG. 8A illustrates a top view of the first section 203. In this embodiment, the primary injection channel 206 may be centrally located along the long axis of the injection core 202. FIG. 8B illustrates a right side view of the first section 203. The first section 203 may comprise a reduced diameter 250 that may, when the first section 203 and the second section 205 are assembled together, form part of a circumferential groove 204 in the injection core 202 for forming a ring pattern having "comfort fit" dimensions. The first section 203 may also comprise one or more radial grooves 252 that may, when the first section 203 and the second section 205 are assembled together, form part of one or more radial injection channels 207 in the injection core 202. As may be seen in FIG. 8B, the primary injection channel 206 dimensions may comprise one or more suitable draft angles for removing a solidified or cured pattern (such as item 222 in FIG. 7). FIG. 8C illustrates a bottom view of the first section 203. As may be seen in FIG. 8C, the radial injection channels may, in some embodiments, be curved to allow better flow of pattern material into the circumferential groove 204 of the two-part injection core 203. The draft angle(s) of the primary injection channel 206 may result in the primary injection channel 206 having multiple diameters.

Figure 9A:
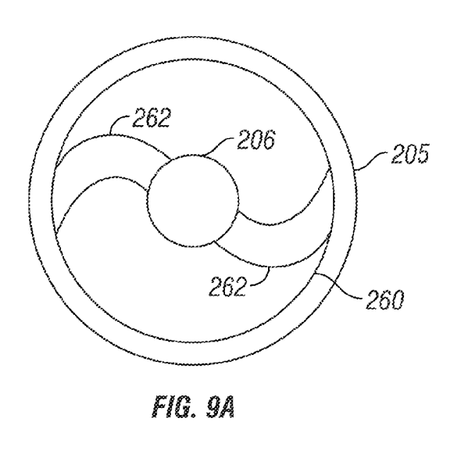
FIGS. 9A-C illustrate top, right side and isometric views of an embodiment of a second section of the two-part injection core of FIG. 7.
Figure 9B:
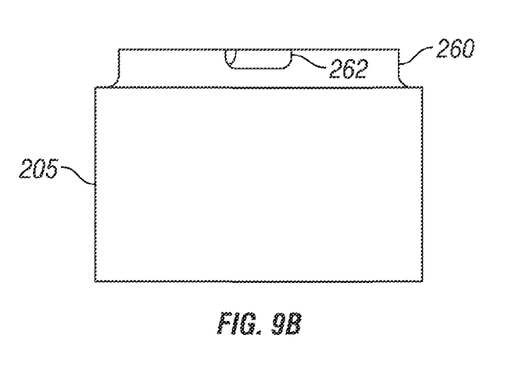
Figure 9C:
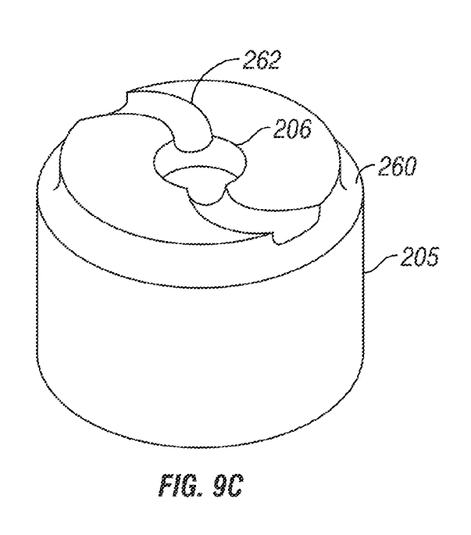

FIGS. 9A-C provide various views of the second section 205 of the two-part injection core 202 of FIG. 7. FIG. 9A illustrates a top view of the second section 205. In this embodiment, the primary injection channel 206 may be centrally located along the long axis of the injection core 202, and extend wholly or partially into the second section 205. FIG. 9B illustrates a right side view of the second section 205. The second section 205 may comprise a reduced diameter 260 corresponding to the reduced diameter 250 of the first section 203. The reduced diameter may, when the first section 203 and the second section 205 are assembled together, form part of a circumferential groove 204 in the injection core 202 for forming a ring pattern having "comfort fit" dimensions. The second section 205 may also comprise one or more radial grooves 262 corresponding to the one or more radial grooves 252 of the first section 203. The radial grooves 262 may, when the first section 203 and the second section 205 are assembled together, form part of one or more radial injection channels 207 in the injection core 202. The primary injection channel 206 dimensions may comprise one or more suitable draft angles for removing a solidified or cured pattern (such as item 222 in FIG. 7). FIG. 9C illustrates a perspective view of the second section 205.

The embodiment of FIG. 7 may include a block 90 as in the embodiment of FIG. 6. The embodiment of FIG. 7 may also include a cover 210 similar to the cover 92 of the embodiment of FIG. 6, except having a nozzle opening 212 located so as to allow alignment of an injector nozzle with the primary injection channel 206. The embodiment of FIG. 7 may further include a mold 220 formed as described above, except without a cavity corresponding to a gate form 22. In other words, mold 220 may be formed using a model without a gate. After the injection frame, mold 220 and injection core 202 are assembled, wax or plastic may be injected into the primary injection channel 206 in the manner discussed above. The wax or plastic may flow through the primary injection channel 206, through the radial injection channels 207 and into the cavity 218 formed by a model (not shown). The wax or plastic may solidify or cure into a pattern 222. After the wax or plastic solidifies or cures, the injection frame may be disassembled, and the injection core 202 with the pattern 222 may be removed from the mold 220. After removal, the injection core 202 may itself be disassembled by separation of the first section 203 from the second section 205 to allow removal of the pattern 222.

Figure 10A:
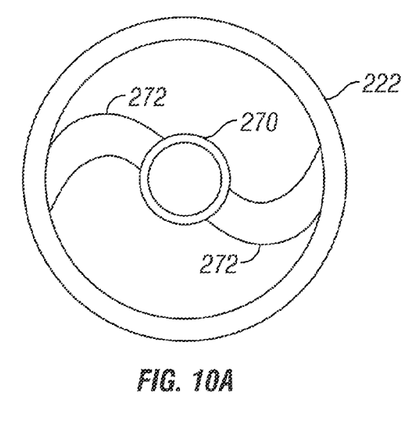
FIGS. 10A-C illustrate top, right side and isometric views of a ring pattern formed using the two-part injection core of FIG. 7.
Figure 10B:
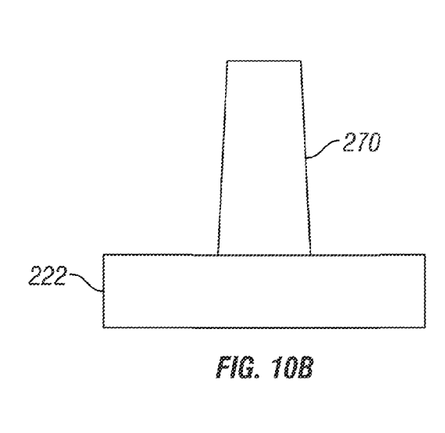
Figure 10C:
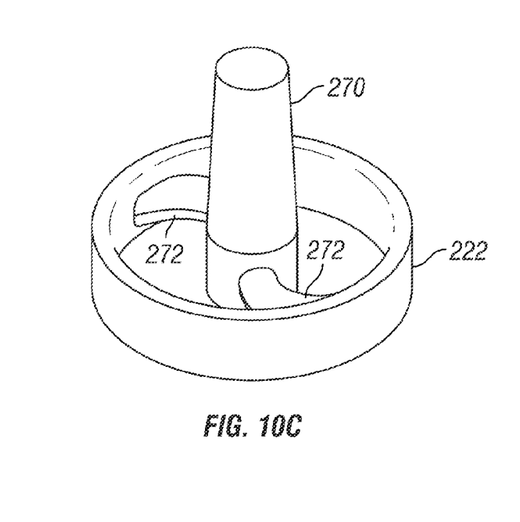

FIGS. 10A-C provide various views of the pattern 222 formed using the embodiment of FIG. 7. The pattern 222 may comprise a gate 270 and contacts 272 formed by the primary injection channel 206 and radial injection channels 207 of the injection core 202. The pattern may be mounted using gate 270 to a sprue rod to form a casting tree for investment casting as is known in the art.

Use of the injection frame 90 and 92 and injection core 102 may minimize distortion of the mold 94 as the injection nozzle is pressed against the injection frame and liquid pattern material is injected into the mold. Use of the injection frame and injection core may also allow for higher-than-normal injection pressures while minimizing mold shifting or mold cavity distortion. Use of the injection core may ensure that the dimensional consistency set by the mold core continues in the pattern. Thus, use of the injection core may further minimize shrinkage of the pattern as it cools. When manufacturing jewelry rings, for example, minimizing shrinkage of the patterns may ensure better size consistency in the finished cast product.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, compositions of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

I claim:

1. A method for creating a pattern of a model, said method comprising the steps of:
   providing a mold frame forming a mold enclosure to receive a mold core on an inside wall surface of and extending inwardly into said mold enclosure, said mold core comprising an index post having a smaller outer dimension than said mold core, said mold frame forming a gate aperture, a mold material aperture, and an index aperture capable of receiving said index post;
   permanently affixing a model to said mold core;
   mounting a gate to said model;
   placing said mold core and said model in said mold frame such that said gate extends into and substantially seals said gate aperture, said mold frame configured to receive a liquid mold material through said mold material aperture;
   inserting said liquid mold material into said enclosure of said mold frame through said mold material aperture, said mold material capable of solidifying or curing into a flexible mold;
   after said mold material solidifies or cures into said flexible mold having a mold shape, removing said flexible mold from said mold frame;
   removing said mold core and model and gate from said flexible mold, thereby creating a cavity in said flexible mold substantially in the shape of said mold core and model, said gate forming a gate channel in said flexible mold;
   providing an injection frame having a mold receiving space having substantially said mold shape of said flexible mold, said injection frame forming an injection aperture;
   inserting an injection core into said flexible mold cavity;
   placing said flexible mold in said mold receiving space such that said gate channel is aligned with said injection aperture;
   injecting liquid pattern material into said flexible mold through said injection aperture such that said pattern material flows into said flexible mold cavity through said gate channel and around said injection core, said pattern material capable of solidifying or curing into a pattern; and
   after said pattern material solidifies or cures into a pattern, removing said injection core and said pattern from said flexible mold.

2. The method of claim 1, wherein said model and mold core are a single item of manufacture.

3. The method of claim 1, wherein said liquid mold material solidifies or cures at approximately room temperature.

4. The method of claim 1, comprising aligning said injection frame to an injector to minimize distortion of said flexible mold in said injection step.

5. The method of claim 1, wherein said pattern material comprises wax or plastic.

6. The method of claim 1, wherein said model comprises a ring, and said injection core comprises at least two separable sections and is shaped to form a "comfort-fit"-type pattern of said model.

7. An apparatus for creating a pattern of a model comprising:
   a mold frame forming a gate aperture, a mold material aperture, and an index aperture, said mold frame configured to receive a liquid mold material through said mold material aperture in a mold enclosure space, said mold material capable of solidifying or curing into a flexible mold having a mold shape;
   a mold core having a model permanently affixable thereto and a gate affixable to said model, said mold core comprising an index post insertable into said index aperture and having a smaller outer dimension than said mold core, said mold core removably mountable in said mold enclosure space of said mold frame such that when a model is affixed to said mold core and a gate is affixed to said model, said gate substantially seals said gate aperture and said index post inserts into said index aperture, said mold core for forming a cavity in said flexible mold, said cavity comprising a gate channel;
   an injection frame forming an injection aperture, and configured to receive said flexible mold in a mold receiving space having substantially said mold shape of said flexible mold, such that said gate channel is aligned with said injection aperture and such that an injection material may be injected into said flexible mold through said injection aperture and said gate channel; and
   an injection core removably insertable into a cavity of said flexible mold.

8. The apparatus of claim 7, said model comprising a ring, and said injection core comprising at least two separable sections, and being shaped to form a "comfort-fit"-type pattern of said model.

9. The apparatus of claim 7, said gate comprising an upper contact and a lower base removably attached thereto.

10. The apparatus of claim 9, wherein said lower base is attachable to a variety of upper contacts.

11. The apparatus of claim 7, further comprising a plurality of mold cores, each said mold core removably mountable in said mold frame and dimensioned for mounting at least one ring model of a particular size.

12. The apparatus of claim 7, wherein said injection frame is mountable to an injector without substantial distortion of said flexible mold.

* * * * *